No. 754,879. Patented March 15, 1904.

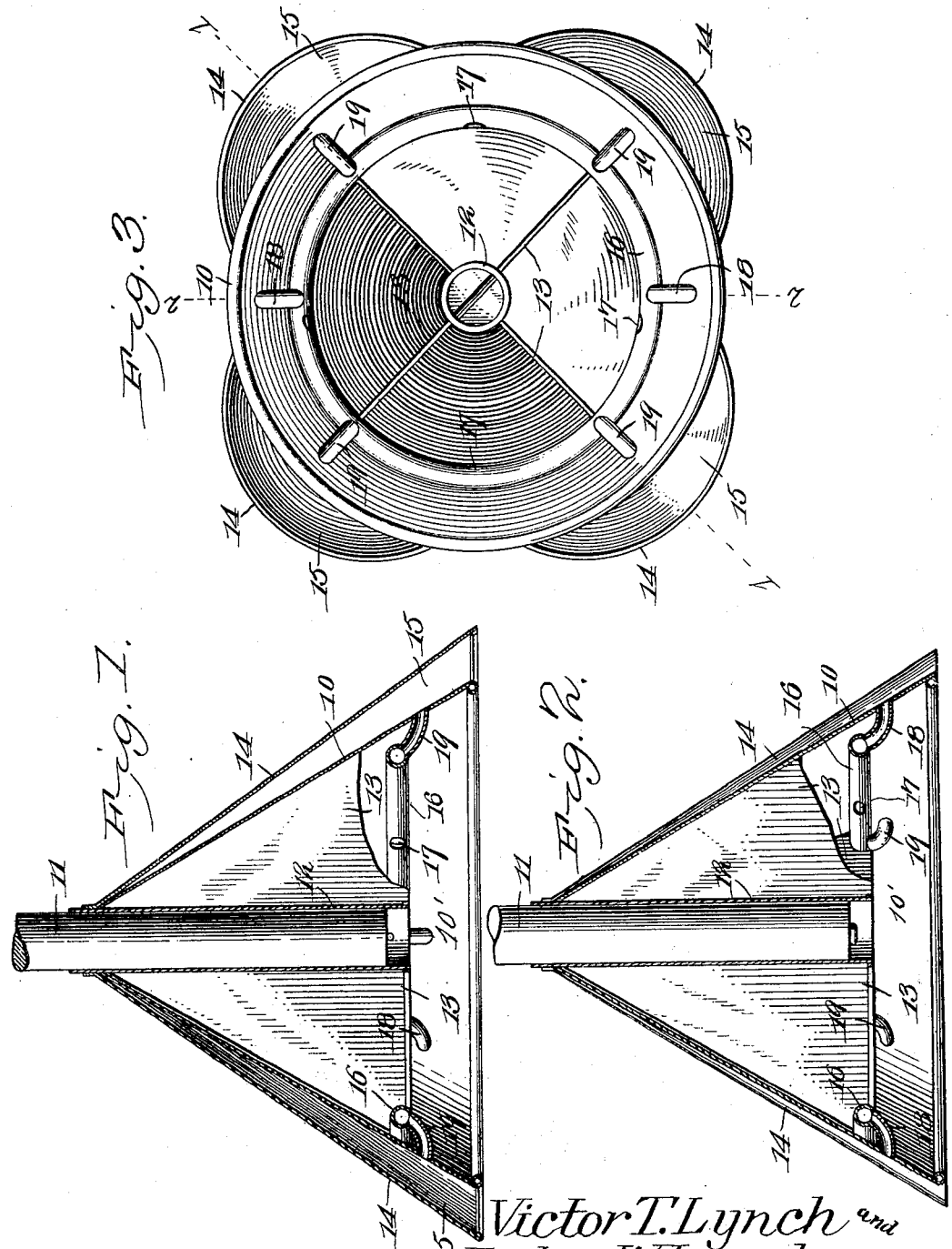

UNITED STATES PATENT OFFICE.

VICTOR T. LYNCH AND EMBRY W. LYNCH, OF COLUMBUS, GEORGIA.

CLOTHES-POUNDER.

SPECIFICATION forming part of Letters Patent No. 754,879, dated March 15, 1904.

Application filed December 19, 1903. Serial No. 185,878. (No model.)

*To all whom it may concern:*

Be it known that we, VICTOR T. LYNCH and EMBRY W. LYNCH, citizens of the United States, residing at Columbus, in the county of Muscogee and State of Georgia, have invented a new and useful Clothes-Pounder, of which the following is a specification.

This invention relates to that class of devices for washing clothes wherein a hollow conical member is employed having various means attached to or associated therewith for causing the water to be drawn into and forcibly expelled from the same, and thus driven through the clothes to be cleansed.

In operating washing implements of the general character of the device herein described as generally constructed the resistance to the upward movement is so great as to be a source of annoyance and materially increases the labor without a corresponding benefit.

The principal object of the present invention is to produce an implement whereby the excessive resistance to the upward movement is reduced without detracting from the efficiency or thoroughness of the action; and with this and other objects in view, as will appear as the nature of the invention is more fully disclosed, the same consists in certain novel features of construction, as hereinafter shown and described, and specified in the claims.

Figure 1 is a sectional view on the line 1 1 of Fig. 3. Fig. 2 is a sectional view on the line 2 2 of Fig. 3. Fig. 3 is a bottom plan view.

The improved implement consists of a conical shell or casing 10, forming a chamber 10', open at the bottom and with an operating-handle 11 extending from the apex of the cone, as shown. The handle is supported by a socket 12 within the chamber 10', formed by the shell 10, and extending radially between the socket and the walls of the chamber are transverse partitions 13, dividing the interior of the chamber into a plurality of compartments. The partitions and socket terminate above the lower edge of the shell 10, thus leaving the lower portion unobstructed, as shown.

Attached to the outer surface of the casing 10 are semiconical members 14, forming a plurality of spaced exterior air-chambers 15, equal in number to the compartments formed by the partitions 13 and open at their bottoms and with their lower ends in horizontal alinement with the lower edge of the shell 10, as shown.

Supported within the chamber 10, beneath the partitions 13, and also spaced from the inner walls of the chamber is an annular tubular member 16, having apertures 17 and provided at two or more points with branches 18, leading through the walls of the chamber 10' and spaced above its lower edge, as shown. The annular member is also provided with branches 19, connecting it with each of the air-chambers 15, as shown. Any number of the air-chambers 15 and partitions 13 may be employed; but generally four of each will be sufficient, as shown.

In operating the device at the downward stroke air cannot escape from the interior of the chamber after the device enters the water far enough to submerge the tubular branches 18, as will be obvious. Hence the water beneath the device will be forcibly driven through the clothes to be cleansed. At the beginning of the upstroke a suction is created which forcibly draws the air upward through the clothes, and this suction continues until the outer ends of the pipes 18 rise above the water, when the entering air will instantly equalize the pressure and destroy the suction by entering the whole interior of the casing 10, including the compartments formed by the partitions 13, which are thus supplied through the apertures 17, as will be obvious. The continued upward pressure, therefore, meets little more resistance than that caused by the weight of the implement. The implement is thus rendered very easy of action, while at the same time retaining a sufficient amount of the "suction" force to accomplish the desired results and thoroughly and forcibly drive the washing-water to and fro through the clothes and obviating all unnecessary resistance. The interior of the implement being divided into a plurality of independent air-chambers by the members 13 and 14, the force is uniformly distributed and acts with corresponding uniformity when the implement is operated.

The implement may be constructed of any suitable material and of any required size and may be of various sizes to adapt it to the work required.

The parts except the handle 11 will generally be of galvanized iron or steel of sufficient gage to withstand the strains to which it will be subjected.

Having thus described the invention, what is claimed is—

1. An implement of the character described comprising a conical chamber open at the bottom and with a handle extending from the apex thereof, said chamber having exterior longitudinal air-chambers open at their lower ends, an annular tubular member supported within said conical chamber and spaced from the bottom thereof and likewise from the side walls of the same and provided with apertures communicating with the interior of the chamber, air-tubes connecting said tubular member with said air-chambers, and air-tubes connected to said tubular member through the walls of said conical chamber and spaced from its bottom.

2. An implement of the character described comprising a conical chamber open at the bottom and with a handle extending from the apex thereof, said chamber divided interiorly into compartments by transverse vertical partitions and with exterior longitudinal air-chambers opening downwardly in transverse alinement with the bottom of said conical chamber, an annular tubular member supported within said conical chamber and spaced from the bottom thereof and likewise from the side walls of the same and provided with apertures communicating with the interior of the chamber, air-tubes connecting said tubular member with said air-chambers, and air-tubes connected to said tubular member through said conical chamber and spaced from its lower edge.

In testimony that we claim the foregoing as our own we have hereto affixed our signatures in the presence of two witnesses.

VICTOR T. LYNCH.
     EMBRY W. LYNCH.

Witnesses:
 CHAS. M. WOOLFOLD,
 W. CECIL NEILL.